(12) United States Patent
Britt, Jr.

(10) Patent No.: US 6,742,038 B2
(45) Date of Patent: *May 25, 2004

(54) SYSTEM AND METHOD OF LINKING USER IDENTIFICATION TO A SUBSCRIBER IDENTIFICATION MODULE

(75) Inventor: Joe Freeman Britt, Jr., Los Gatos, CA (US)

(73) Assignee: Danger, Inc., Palo Alto, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 09/948,291

(22) Filed: Sep. 6, 2001

(65) Prior Publication Data

US 2002/0032785 A1 Mar. 14, 2002

Related U.S. Application Data

(63) Continuation-in-part of application No. 09/545,701, filed on Apr. 7, 2000.

(51) Int. Cl.⁷ .............................................. G06F 15/16
(52) U.S. Cl. ..................... 709/228; 709/246; 709/313; 717/146; 455/418
(58) Field of Search ................................. 709/228, 246, 709/313; 342/457; 455/426.1, 418; 717/146; 710/62

(56) References Cited

U.S. PATENT DOCUMENTS

| | | |
|---|---|---|
| 4,237,540 A | 12/1980 | Sato |
| 5,159,592 A | 10/1992 | Perkins |
| 5,224,060 A | 6/1993 | Ma |
| 5,268,817 A | 12/1993 | Miyagawa et al. |
| 5,548,477 A | 8/1996 | Kumar et al. |
| 5,548,478 A | 8/1996 | Kumar et al. |
| 5,559,800 A | 9/1996 | Mousseau et al. |

(List continued on next page.)

FOREIGN PATENT DOCUMENTS

| | | |
|---|---|---|
| EP | 1 071 024 A2 | 1/2001 |
| WO | WO 98/36344 A2 | 8/1998 |
| WO | WO 00/30003 | 5/2000 |

OTHER PUBLICATIONS

Timothy Bickmore, Andreas Girgensohn and Joseph W. Sullivan, Web Page Filtering and Re–Authoring For Mobile Users, The Computer Journal, vol. 42, No. 6, 1999, pp. 534–546.

J.C. Mogul, Server–Directed Transcoding, Computer Communications, Elsevier Science Publishers BV, Amsterdam, Feb. 1, 2001, pp. 155–162.

(List continued on next page.)

Primary Examiner—Wen Tai Lin
(74) Attorney, Agent, or Firm—Blakely Sokoloff Taylor & Zafman

(57) ABSTRACT

A system and method for providing access to a server by a wireless computing device is described. A server and a wireless computing device and a communications link between the wireless computing device and the server are provided. The wireless computing device includes a hardware component including a processor and a memory. The server generates instructions and converted data based on data requested by the wireless computing device. The wireless computing device also includes an identification module. The identification module can provide identification data to the server.

12 Claims, 4 Drawing Sheets

U.S. PATENT DOCUMENTS

| | | | |
|---|---|---|---|
| 5,594,910 A | | 1/1997 | Filepp et al. |
| 5,638,257 A | | 6/1997 | Kumar et al. |
| 5,715,387 A | | 2/1998 | Barnstijn et al. |
| 5,727,159 A | | 3/1998 | Kininis |
| 5,727,202 A | | 3/1998 | Kucala |
| 5,778,176 A | | 7/1998 | Geihs et al. |
| 5,790,974 A | | 8/1998 | Tognazzini |
| 5,802,312 A | | 9/1998 | Lazaridis et al. |
| 5,900,848 A | | 5/1999 | Haneda et al. |
| 5,915,095 A | | 6/1999 | Miskowiec |
| 5,949,408 A | | 9/1999 | Kang et al. |
| 5,961,590 A | | 10/1999 | Mendez et al. |
| 5,964,830 A | | 10/1999 | Durrett |
| 5,969,678 A | * | 10/1999 | Stewart ............... 342/457 |
| 6,023,708 A | | 2/2000 | Mendez et al. |
| 6,035,339 A | * | 3/2000 | Agraharam et al. ........ 709/246 |
| 6,076,109 A | * | 6/2000 | Kikinis ............. 709/228 |
| 6,081,708 A | * | 6/2000 | Vasnier ............. 455/426.1 |
| 6,151,677 A | | 11/2000 | Walter |
| 6,157,935 A | | 12/2000 | Tran et al. |
| 6,166,734 A | | 12/2000 | Nahi et al. |
| 6,167,441 A | | 12/2000 | Himmel |
| 6,286,063 B1 | | 9/2001 | Bollerman et al. |
| 6,330,618 B1 | | 12/2001 | Hawkins et al. |
| 6,336,137 B1 | | 1/2002 | Lee et al. |
| 6,370,687 B1 | * | 4/2002 | Shimura ............... 717/146 |
| 6,396,482 B1 | | 5/2002 | Griffin et al. |
| 6,418,310 B1 | * | 7/2002 | Dent ............... 455/418 |
| 6,433,777 B1 | | 8/2002 | Sawyer |
| 6,438,601 B1 | | 8/2002 | Hardy |
| 6,446,004 B1 | | 9/2002 | Cao et al. |
| 2002/0007454 A1 | | 1/2002 | Tarpenning et al. |
| 2002/0010757 A1 | | 1/2002 | Granik et al. |

OTHER PUBLICATIONS

Copy of the PCT Search Report, dated Dec. 19, 2002. 3 pages.

Alta Vista Home Page, http://www.altavista.com/, Aug. 1, 2000, 1 page.

Yahoo Home Page, http://www.yahoo.com/, Aug. 1, 2000, 1 page.

Excite Home Page, http://www.excite.com/, Aug. 1, 2000, 1 page.

Komlodi, A., et al., "Key Frame Preview Techniques for Video Browsing," Digital Library Group, College of Library Information Services, University of Maryland, pp. 118–125.

* cited by examiner

US 6,742,038 B2

SYSTEM AND METHOD OF LINKING USER IDENTIFICATION TO A SUBSCRIBER IDENTIFICATION MODULE

PRIORITY

This application is a continuation-in-part of U.S. Ser. No. 09/545,701, filed Apr. 7, 2000, entitled "Network Portal Apparatus and Method."

BACKGROUND OF THE INVENTION

1. Field of the Invention

This invention relates generally to the field of network data services. More particularly, the invention relates to an apparatus and method for managing network portal data.

2. Description of the Related Art

"Portals" are World Wide Web ("WWW") sites which help users manage and navigate through vast amounts of information stored on the Internet. Some well known Internet portals include "Yahoo!®," AltaVista®, and Excite®. Portals typically provide search features which allow users to search for particular types of content by entering keywords. In response to the keyword search request, the portal returns links to relevant Internet sites and/or relevant content stored directly on the portal. For example, if a user enters the keyword "snowboarding," the portal may return a list of hyperlinks to Internet sites related to snowboarding as well as internal portal categories related to snowboarding (e.g., "Recreation>Sports>Snowboarding").

In addition to the keyword search and content management capabilities described above, portals may also provide users with a variety of network applications such as, for example, email, electronic scheduling and contact management, chat groups, newsgroups, personal financing, and instant messaging, to name just a few.

Many portals also provide a registration feature which allows users to customize the types of information and/or applications which will be immediately accessible to the user on the portal. For example, the user may configure the portal to automatically retrieve and display information specified by the user such as, for example, the value of the user's stock portfolio, the weather forecast in the user's geographic location, an indication of any unread email messages, the user's appointments for the day, the local news headlines for the day, and/or the television listings for the user's favorite channels that evening.

When the user visits the portal (e.g., via a client computer), he/she may be presented with a single Web page that contains all of the foregoing information, automatically collected and transmitted by the portal. Typically, a portal will transmit a unique Web page and associated data to the user in this manner only after receiving proper authentication (e.g., user ID and password).

SUMMARY

A system and method for providing access to a server by a wireless computing device is described. A server and a wireless computing device and a communications link between the wireless computing device and the server are provided. The wireless computing device includes a hardware component including a processor and a memory. The server generates instructions and converted data based on data requested by the wireless computing device. The wireless computing device also includes an identification module. The identification module can provide identification data to the server.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Network Architecture

Figure 1:
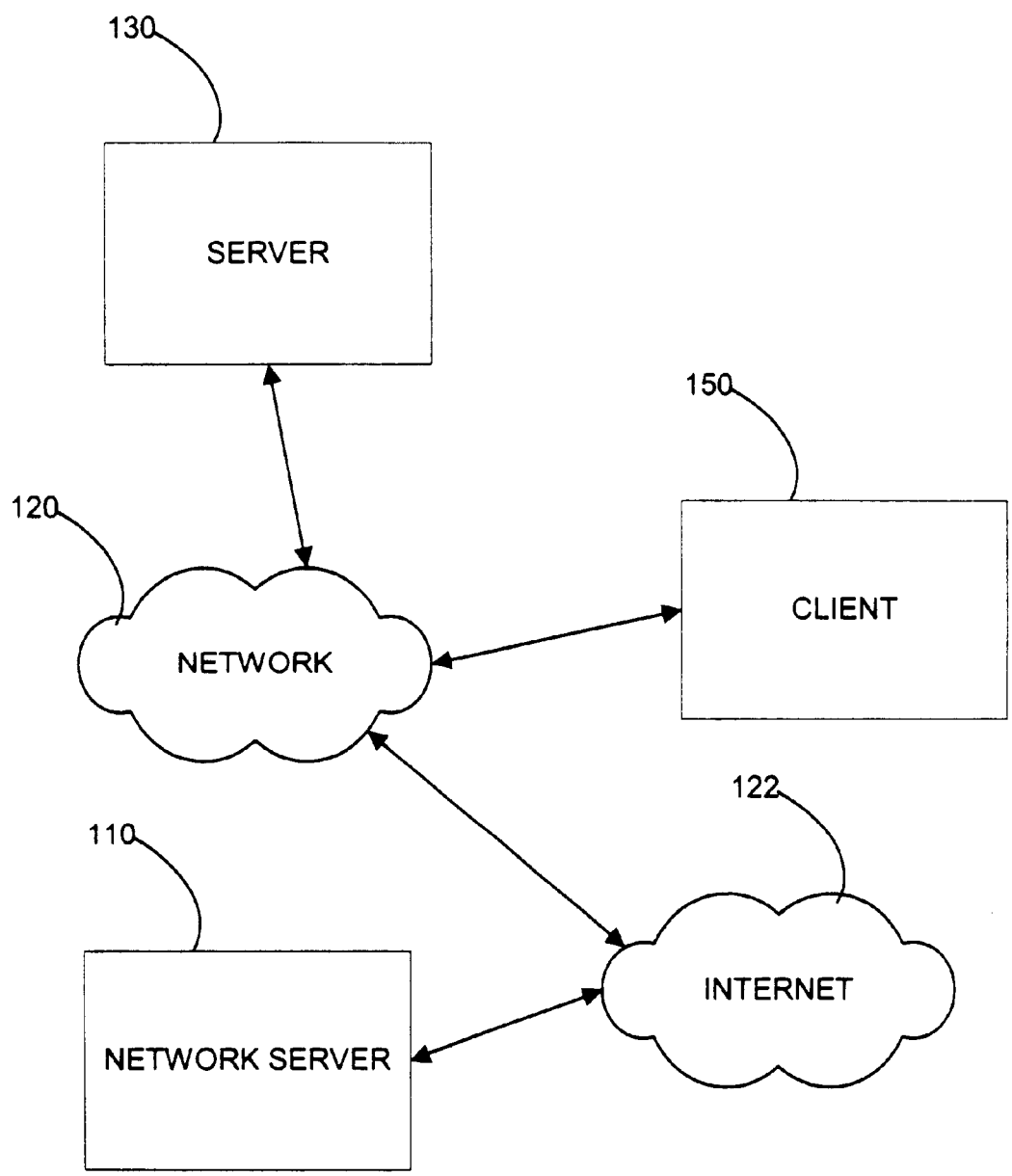
FIG. 1 illustrates an exemplary network architecture used to implement elements of the present invention.

Elements of the present invention may be included within a client-server based architecture 100 such as that illustrated in FIG. 1. According to the embodiment depicted in FIG. 1, a server 110 communicates with a client 150 such as a wireless computing device and other network servers 130 over a network 120 (e.g., the Internet 122). The network 120 over which the clients 140 and servers 110, 130 transmit and receive data may be comprised of any combination of private (e.g., leased) and/or public communication channels. These may include, for example, Digital Signal ("DS") channels (e.g., DS-3/T-3, DS-1/T1), Synchronous Optical Network ("SONET") channels (e.g., OC-3/STS-3), Integrated Services Digital Network ("ISDN") channels, Digital Subscriber Line ("DSL") channels, cable modem channels and a variety of wireless communication channels including satellite broadcast and cellular channels.

In addition, various networking protocols may be used to support communication across the network 120 including, for example, the Asynchronous Transfer Mode ("ATM"), Ethernet, and Token Ring (at the data-link level); as well as Transmission Control Protocol/Internet Protocol ("TCP/IP"), Internetwork Packet Exchange ("IPX"), AppleTalk and DECnet (at the network/transport level). It should be noted, however, that the principles of the invention are not limited to any particular communication channel or protocol.

The server 110 in one embodiment includes a user database for storing various types of user configuration and account data. Users may register and login to the server 110 from a client 150 by specifying a user ID and/or password. According to one embodiment, a user connects to the servers 110, 130 via a browser application such as Netscape Navigator™ or Microsoft Internet Explorer™ which communicates via the Hypertext Transfer Protocol (hereinafter "HTTP").

In one embodiment, users may configure the server 110 to retrieve and manage specific types of information. For example, a user may configure the server 110 to retrieve up-to-date stock quotes for a specified set of stocks (e.g., reflecting the user's portfolio), to collect the weather forecast for the user's hometown, and/or to retrieve recent articles relating to a particular sports franchise. The portal server will then retrieve the specified information from other servers (e.g., server 130) on behalf of the user.

In addition to information retrieval and management, in one embodiment the server 110 also provides application services such as email, online scheduling (e.g., appointments, to-do lists, etc), instant messaging, contact management, word processing and a variety of other online services. Users may access these services by logging in to the server 110 with a valid user ID and password. In one embodiment, the server 110 generates a unique, personalized Web page for each user containing links to all, or a subset of, the information and/or services subscribed to by the user.

Embodiments of the Invention

In one embodiment, a wireless computing device 150 stores and processes user-specified information and/or programs as well as non-user-specified information/programs (e.g., targeted advertisements based on the user's profile). The information/programs may be transmitted to the wireless computing device 150 through the client 150, and/or directly via wireless broadcast. Thus, the wireless computing device 150 in this embodiment is a removable extension of the server 110, storing a subset of the information and services maintained by the server 110 on behalf of the user. For example, a user may configure the server 110 to periodically download the user's to-do list (or other scheduling data) to the wireless computing device (e.g., every morning, every two hours, every time the user connects the wireless computing device to the client 150, etc). When the user leaves the office, he/she can simply take the wireless computing device with him/her and view his/her schedule throughout the day.

The timing of the information/program download may depend on the particular embodiment of the wireless computing device 150. For example, downloads may occur at any time when the wireless computing device 150 is within wireless transmission range.

In one embodiment, the user may customize the wireless computing device 150 preferences and content which will be downloaded to the wireless computing device 150 from the server 110. This may be accomplished, for example, by selecting certain preferences/content from a server 110 Web page (e.g., by using an online programming interface as described below). For example, the user may choose to have each day's to-do list downloaded to his wireless computing device 150 and may also program the device 150 (e.g., via the server 110) to continually display the next scheduled event for the day. Various other user interface and content-based data may be transmitted to the wireless computing device 150 from the server 110 while still complying with the underlying principles of the invention.

Embodiments of the Wireless Computing Device

Figure 2:
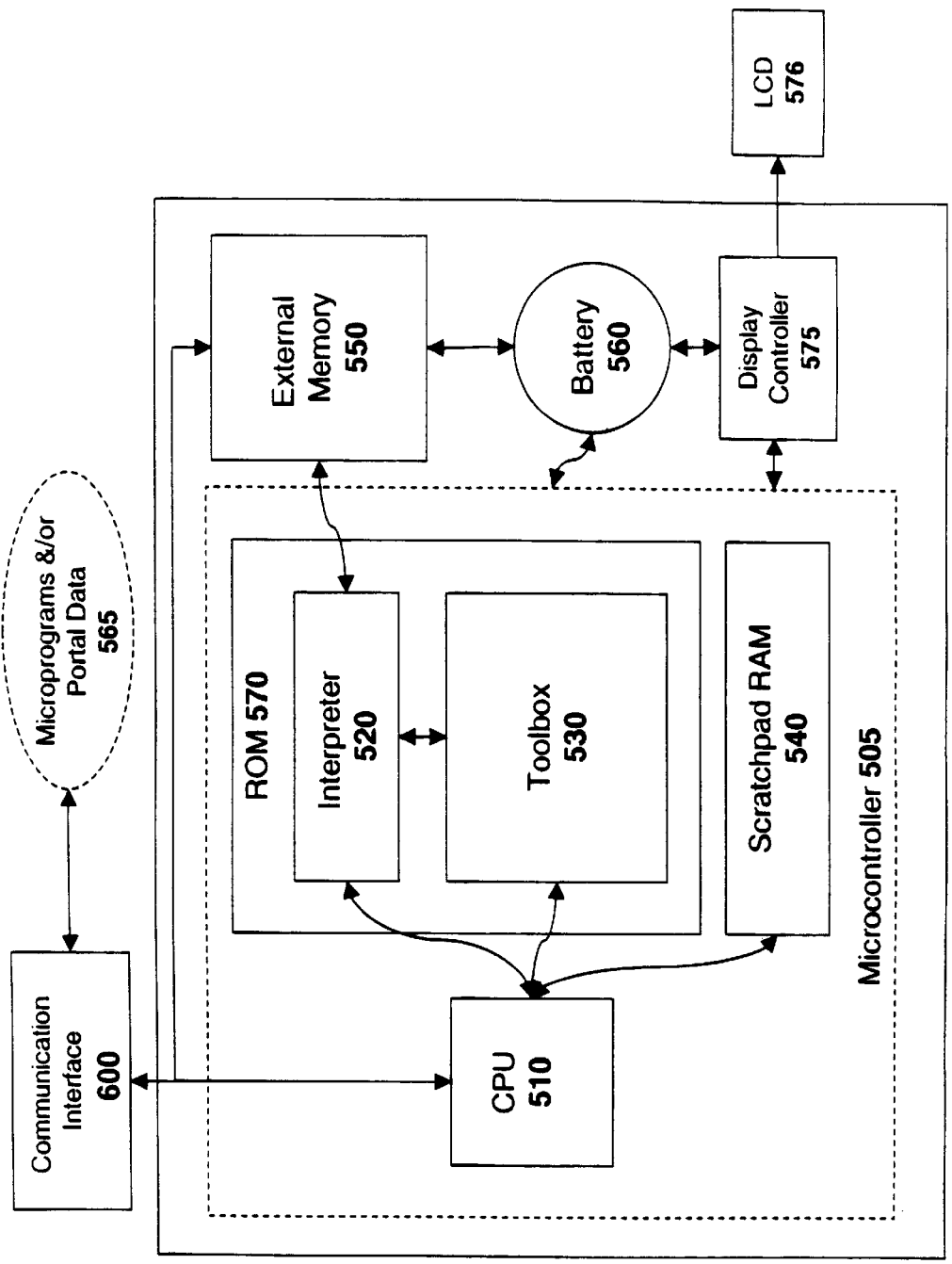
FIG. 2 illustrates wireless computing device communication according to one embodiment of the invention.

As illustrated in FIG. 2, one embodiment of the wireless computing device 150 is comprised generally of a microcontroller 505, an external memory 550, a display controller 575, and a battery 560. The external memory 550 may be used to store programs and/or portal data 565 transmitted to the wireless computing device 150 from the server 110 (e.g., via client 150 and/or radio station 210). In one embodiment, the external memory 550 is non-volatile memory (e.g., an electrically erasable programmable read only memory ("EEPROM"); a programmable read only memory ("PROM"), etc). Alternatively, the memory 550 may be a volatile memory (e.g., random access memory or "RAM") but the data stored therein may be continually maintained via the battery 560. The battery 560 in one embodiment is a coin cell battery (e.g., of the same type used in portable electronic devices such as calculators and watches). In one embodiment, when the battery power decreases below a threshold level, the wireless computing device 150 will notify the user and/or the server 110. The server 110 in one embodiment will then automatically send the user a new battery.

The microcontroller 505 of one embodiment is comprised of a central processing unit ("CPU") 510, a read only memory ("ROM") 570, and a scratchpad RAM 540. The ROM 570 is further comprised of an interpreter module 520 and a toolbox module 530.

The toolbox module 530 of the ROM 570 contains a set of toolbox routines for processing data, text and graphics on the wireless computing device 150. These routines include drawing text and graphics on the wireless computing device's display 430, decompressing data transmitted from the server 110, reproducing audio on the wireless computing device 150, and performing various input/output and communication functions (e.g., transmitting/receiving data over the client link 160 and/or the RF link 220). A variety of additional wireless computing device functions may be included within the toolbox 530 while still complying with the underlying principles of the invention.

In one embodiment, microprograms and portal data 560 are transmitted from the server 110 to the external memory 550 of the wireless computing device via a communication interface 600 under control of the CPU 510. Various communication interfaces 600 may be employed without departing from the underlying principles of the invention including, for example, a Universal Serial Bus ("USB") interface or a serial communication ("serial") interface or an RF based communication device such as a cellular telephone. The microprograms in one embodiment are comprised of compact, interpreted instructions known as "bytecodes," which are converted into native code by the interpreter module 520 before being executed by the CPU 510. One of the benefits of this configuration is that when the microcontroller/CPU portion of the wireless computing device 150 is upgraded (e.g., to a faster and/or less expensive model), only the interpreter module 520 and toolbox 530 of the ROM needs to be rewritten to interpret the currently existing bytecodes for the new microcontroller/CPU. In addition, this configuration allows wireless computing devices 150 with different CPUs to coexist and execute the same microprograms. Moreover, programming frequently-used routines in the ROM toolbox module 530 reduces the size of microprograms stored in the external memory 550, thereby conserving memory and bandwidth over the client link 160 and/or the RF link 220. In one embodiment, new interpreter modules 520 and/or toolbox routines 530 may be developed to execute the same microprograms on cellular phones, personal information managers ("PIMs"), or any other device with a CPU and memory.

One embodiment of the ROM 570 may be comprised of interpreted code as well as native code written specifically for the microcontroller CPU 505. More particularly, some toolbox routines may be written as interpreted code (as indicated by the arrow between the toolbox 530 and the interpreter module 520) to conserve memory and bandwidth for the same reasons described above with respect to microprograms. Moreover, in one embodiment, data and microprograms stored in external memory 550 may be configured to override older versions of data/microprograms stored in the ROM 570 (e.g., in the ROM toolbox 530).

As mentioned above, the wireless computing device 150 may communicate with the server 110 using various RF communication techniques. For example, in one particular embodiment, the wireless computing device 150 transmits and receives data to/from a cellular network via the cellular digital packet data ("CDPD") standard. As it is known in the art, the CDPD standard is a digital wireless standard that is deployed as an enhancement to the existing analog cellular network. It provides a packet overlay onto the AMPS network and moves data at 19.2 Kbps over continuously-changing unused intervals in standard voice channels. Accordingly, this embodiment of the wireless computing device is capable of exploiting normally unused bandwidth on a nation-wide, analog cellular network. Embodiments of the wireless computing device may also be configured to transmit/receive data using a variety of other communication standards including 2-way paging standards and third generation ("3G") wireless standards (e.g., UTMS, CDMA 2000, NTT DoCoMo, . . . etc).

Figure 3:
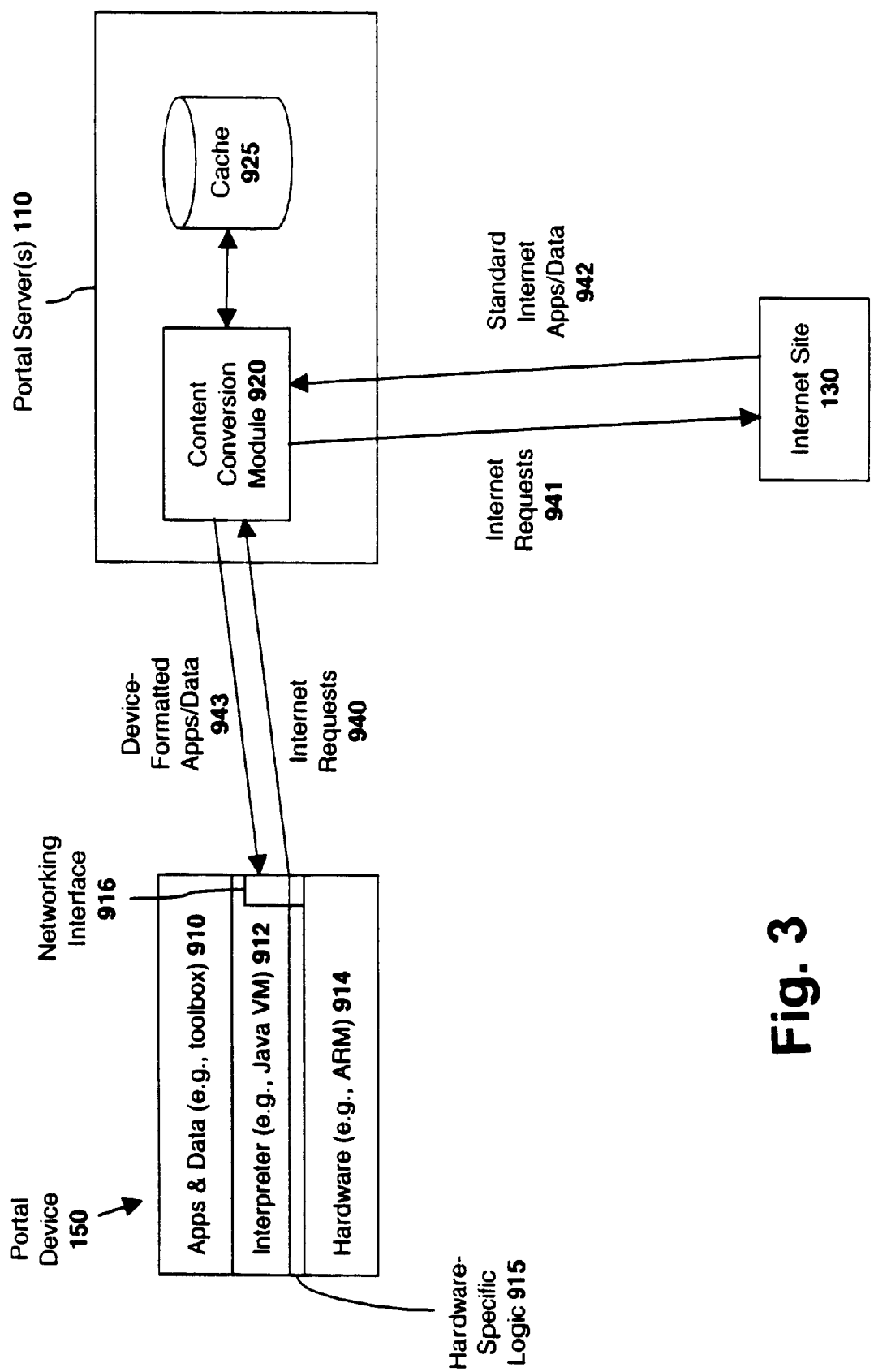
FIG. 3 illustrates a block diagram of a wireless computing device according to one embodiment of the invention.

As described above, because certain embodiments of the wireless computing device 150 are configured to process hardware-independent interpreted code (e.g., via an interpreter module 520 such as a Java virtual machine), applications may be ported to new hardware platforms without significant changes. In addition, as illustrated in FIG. 3, in one embodiment, communications functionality is provided via a modular networking interface 916, which may be easily modified/replaced without altering existing wireless computing device applications 910 or significant portions of the bytecode interpreter 912. For example, when changing from a CDPD network to a 3G network, only the network interface component 916 of the VM interpreter 912 will need to be updated (along with any required 3G hardware 914) to support the new 3G protocol.

As described above (and as indicated in FIG. 3), in one embodiment, the interpreter module 912 on the wireless computing device 150 is a Java virtual machine. As such, this embodiment of the wireless computing device 150 is capable of executing a vast library of existing hardware-independent Java applications (e.g., applets/bytecodes) 910. Moreover, as indicated in FIG. 3, one embodiment of the wireless computing device employs a 32-bit RISC-based microprocessor such as an ARM processor. As is known in the art, ARM processors are widely used in PDAs, cell phones and a variety of other wireless devices. It should be noted, however, that various other hardware and software (and/or firmware) architectures may be used for the wireless computing device 150 while still complying with the underlying principles of the invention.

As described above, one embodiment of the server 110 converts standard applications and data into a format which the wireless computing device 150 can properly interpret. Accordingly, as illustrated in FIG. 3, this embodiment of the server 110 may include a content conversion module 920 for processing wireless computing device 150 requests for Internet content 940. More particularly, in one embodiment, the server 110 acts as a proxy for the wireless computing device 150, forwarding Internet requests 940, 941 to the appropriate Internet site 130 on behalf of the wireless computing device 150, receiving responses from the Internet site 130 in a standard Internet format (e.g., Web pages with embedded audio/video and graphical content), and converting the standard Internet responses 924 into a format which the wireless computing device 150 can process (e.g., bytecodes).

For example, the conversion module 920 may include a hypertext markup language ("HTML") rendering module (not shown) for interpreting HTML code and downloading any embedded content in the HTML code (e.g., graphics, video, sound, . . . etc) to the server 110. The conversion module 920 may then combine the HTML code and embedded content and generate a set of bytecodes for accurately reproducing the requested content on the wireless computing device 150. As described above, in one embodiment, the bytecodes may be Java bytecodes/applets. However, various other types of interpreted and/or non-interpreted code may be generated, depending on the particular type of wireless computing device 150 being used (e.g., one with an interpreter module or one without).

Because the server 110 has an intimate knowledge of the capabilities/configuration of each wireless computing device 150 (e.g., screen size, graphics/audio capabilities, available memory, processing power, user preferences, . . . etc) it can reconstruct the requested Internet content accurately, while at the same time minimizing the bandwidth required to transmit the content to the device 150. For example, the conversion module 920 may perform pre-scaling and color depth adjustments to the requested content so that it will be rendered properly within the wireless computing device 150 display. In making these calculations, the conversion may factor in the memory and processing power available on the wireless computing device 150. In addition, the conversion module 920 may compress the requested content using a variety of compression techniques (and thereby preserve network bandwidth).

In one embodiment, the conversion module 920 will simply discard Internet content which either cannot be reproduced on the wireless computing device 150, or which the user has indicated that he/she does not want to be reproduced on the wireless computing device. For example, a user may indicate that he/she does not want sounds to be generated on the wireless computing device 150 or that he/she does not want advertisements transmitted to the wireless computing device 150. The conversion module 920 will then remove any sounds or advertisements embedded in the requested Web page (or other requested Internet content). Because HTML rendering and other advanced processing of Internet content/data is offloaded to the server 110 as described above, the wireless computing device 150 can be manufactured using a low power microprocessor or microcontroller, thereby lowering the cost of manufacture and/or the energy consumed by the device 150.

In one embodiment, when a particular Web page or other Internet object has been converted into a format suitable for execution on the wireless computing device 150 (e.g., Java bytecodes and data) the formatted page/object may be stored locally on a cache 925 at the server 110 (or other server maintained by the PO). Thus, the next time the content is requested, the conversion module 920 may simply read the previously-generated code from the local cache 925 (i.e., it will no longer need to retrieve the content from remote locations to reconstruct the code).

Various caching techniques and algorithms may be implemented to ensure that the cache 925 is storing Internet data efficiently (i.e., resulting in an acceptable percentage of cache 'hits') and that the data is current. For example, the server 110 may cache the most frequently-requested Internet data (e.g., the Yahoo™ home page), and may remove content from the cache based on a least-recently used caching policy. In addition, to ensure that data stored in the cache is current, the server 110 may compare the version of the data stored in the cache 925 with the version of data stored at the remote Internet site 130 when the data is requested. Similarly, the server 110 may store data in the cache 925 for some predetermined period of time before checking the remote server 130 for a new version. Various other Internet caching techniques may be employed while still complying with the underlying principles of the invention (e.g., those defined in the Internet Caching Protocol ("ICP") and/or the Cache Array Routing Protocol ("CARP")).

Figure 4:
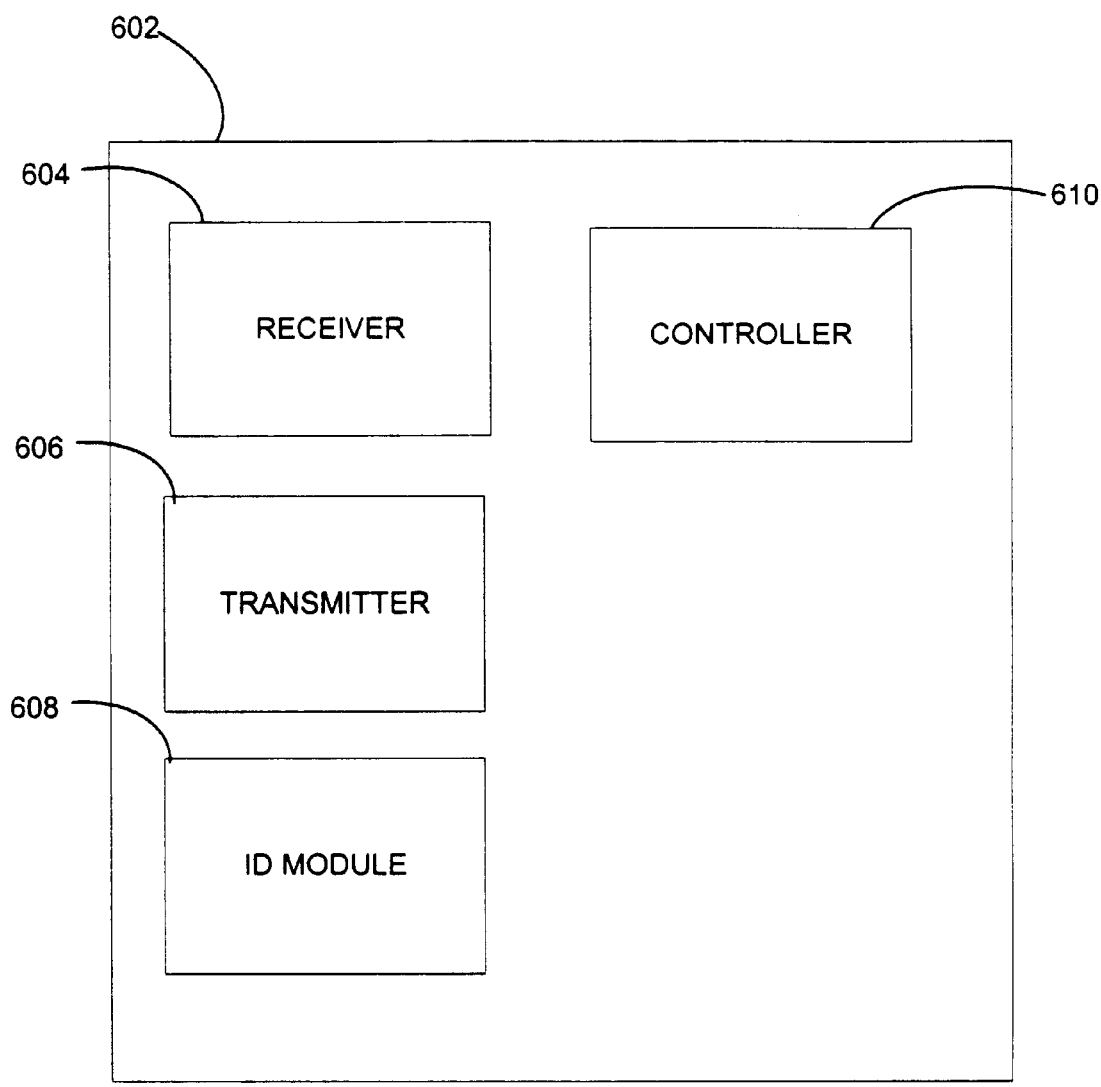
FIG. 4 illustrates a communication interface of one embodiment.

In one embodiment, the communication interface 600 includes the radio portion 602 of a cellular telephone such as shown in FIG. 4. The radio portion 602 of a cellular telephone includes a receiver 604, a transmitter 606, a controller 610. The radio portion 602 of a cellular telephone can also include an identification module 608.

In one embodiment, the wireless computing device 150 includes an identification module such as the identification module 608. The identification module is assigned to a user. The server can use the identification data from the identification module to identify the user.

The International Telecommunication Union (ITU) is an intergovernmental organization through which public and private organizations develop telecommunications standards. One of the recent ITU standards is the so-called Third Generation (3G) standard for wireless telecommunications. Analog cellular was the first generation, digital Personal Communications Service (PCS) was the second generation.

3G will function over the various, existing wireless air interfaces such as Time Division Multiple Access, (TDMA), Global System for Mobile Communications (GSM) and Code-Division Multiple Access (CDMA). In addition, a new EDGE (Enhanced Data rates for Global Evolution) air interface has been developed specifically to meet the bandwidth needs of 3G.

TDMA is a technology for delivering digital wireless service using time division multiplexing (TDM). TDMA works by dividing a radio frequency into time slots and then allocating slots to multiple calls. In this way, a single frequency can support multiple, simultaneous data channels. GSM is one of the leading digital cellular systems. GSM uses a narrow band TDMA and allows eight simultaneous calls on the same radio frequency.

As described above, the wireless computing can use any of the 3G communication systems to provide the wireless link between the wireless computing and the portal server. In another embodiment, the communication interface 600 includes the radio portion 602 of a GSM cellular telephone (GSM radio) such as shown in FIG. 4. One embodiment of the GSM radio includes an identification module 608 such as a subscriber information module (SIM). The SIM includes a unique "data signature" such as a serial number or equivalent. When a user opens an account in the GSM system, the user is assigned to the SIM. The SIM thereafter identifies the user to the GSM system. When a GSM radio is used in the GSM system, the data signature from the SIM is transmitted to the GSM system. The GSM system then validates the SIM. If the SIM is not valid, then the device is denied access to the GSM system.

In one embodiment, the SIM allows a user to move his SIM from one GSM radio to another while still maintaining valid access to the GSM system. For example, if a user decides to purchase a new telephone, he must only remove his SIM from his existing telephone and install his SIM in his new telephone. Thereafter, without any assistance from a GSM system operator, the user's new telephone will function in the GSM system and will be linked to the user's account. Further, the user's previous telephone will no longer function.

In one embodiment, the GSM system automatically transmits the SIM derived user identification to the portal server. In another embodiment, the SIM data is transmitted directly from the wireless computing device to the portal server. The portal server then validates the SIM data to identify the user similar to the GSM system validating the SIM data.

In one embodiment, the identification module allows a user to easily move from a first wireless computing device to a second wireless computing device. Upon validation of the identification module data, the user will have access to the data on the portal server such as his personalized data, email and user configuration data. This allows the user to quickly and easily move between wireless computing devices without having to re-enter data and user configuration. In an alternative embodiment, the wireless computing device may have access to public information available from the portal server but access to a user's personalized data, email and user configuration will only be provided after the identification data is validated.

In one embodiment, the identification data from the identification module automatically logs the user onto the portal server. In another embodiment, the identification data from the identification module allows the user access to the portal but also requires an additional password or similar access code to provide access to a user's personalized data, email and user configuration.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the system described above employs a single server 110, alternative embodiments of the invention may include numerous different servers (e.g., database servers, web servers, etc), and/or mirrored servers distributed across a network. Moreover, while the embodiments described above focus on a wireless computing device which executes interpreted code (e.g., Java bytecodes), the principles of the invention may also be implemented on devices which execute non-interpreted code. Accordingly, the scope and spirit of the invention should be judged in terms of the claims which follow.

What is claimed is:

1. A server system comprising:
    a portal device comprising a processor for processing native program code and an interpreter module for interpreting bytecodes and converting the bytecodes into the native program code for processing by the processor;
    a portal server to forward a request for data on behalf of the portal device; receive said data on behalf of the portal device; the portal server comprising a content conversion module to convert the requested data to bytecodes which the interpreter module on the portal device can convert into native program code;

the portal server to transmit the converted data to the wireless computing device;

wherein the portal device further comprises a wireless radio module to communicatively link the portal server and the portal device, wherein the wireless radio module includes an identification module containing identification data related to an end user, and wherein the portal server automatically reads the identification data and responsively logs the end user in to the server; and wherein the identification module is removable from the portal device and wherein the identification module can be installed in a second portal device and wherein the second portal device transmits identification data from the identification module and wherein the portal server:

receive the identification data;

validates the identification data; and communicates with the second portal device if the identification data is valid.

2. The server system as recited in claim 1, wherein the wireless radio module comprises a Global System for Mobile Communications (GSM) compliant wireless radio module.

3. The server system as recited in claim 2, wherein the GSM compliant radio module provides user identification data to the portal server.

4. The server system as recited in claim 2, wherein the identification module comprises a subscriber identification module (SIM).

5. The server system as recited in claim 4, wherein the portal server:

receives the SIM data;

validates the SIM data; and communicates with portal device if the SIM data is valid.

6. The server system as recited in claim 1, wherein the portal server:

receives the identification data;

validates the identification data; and communicates with the portal device if the identification data is valid.

7. The server system as recited in claim 1, wherein the forwarded request for data on behalf of a portal device includes data from an Internet site.

8. A method for providing access to a portal server by a wireless computing device comprising:

automatically reading identification data from an identification module within a wireless radio module of the portal device, the identification data uniquely identifying a particular end user, and responsively logging the end user in to the portal server;

forwarding a request for data to an Internet site on behalf of the portal device;

receiving said data from said Internet site on behalf of said portal device;

converting said data to bytecodes which an interpreter module on said portal device can convert into native program code which a processor on said portal device can process; and transmitting said bytecodes to said portal device;

wherein the identification module is removable from the portal device and wherein the identification module can be installed in a second portal device and wherein the second portal device transmits identification data from the identification module and wherein the portal server:

receives the identification data;

validates the identification data; and communicates with the second portal device if the identification data is valid.

9. The method as recited in claim 8, further comprising:

transmitting identification data from the identification module;

receiving the identification data in the portal server;

validating the identification data at the portal server; and providing the data from the server to the wireless computing device only if the identification data is valid.

10. The method as recited in claim 8, wherein the wireless radio module comprises a Global System for Mobile Communications (GSM) compliant wireless radio module.

11. The method as recited in claim 10, wherein the identification module includes a subscriber identification module ("SIM").

12. The method as recited in claim 10, wherein the GSM system includes an identification data link to the portal server wherein the GSM provides user identification data to the portal server.

* * * * *